(12) United States Patent
Cate

(10) Patent No.: US 10,247,400 B2
(45) Date of Patent: Apr. 2, 2019

(54) SAFETY LIGHT FOR LAW ENFORCEMENT AND ROAD-SIDE EMERGENCY

(71) Applicant: Kyle Thomas Cate, Johnstown, CO (US)

(72) Inventor: Kyle Thomas Cate, Johnstown, CO (US)

( * ) Notice: Subject to any disclaimer, the term of this patent is extended or adjusted under 35 U.S.C. 154(b) by 0 days.

(21) Appl. No.: 15/431,583

(22) Filed: Feb. 13, 2017

(65) Prior Publication Data

US 2017/0234525 A1 Aug. 17, 2017

Related U.S. Application Data

(60) Provisional application No. 62/388,966, filed on Feb. 12, 2016.

(51) Int. Cl.
*B60Q 1/00* (2006.01)
*F21L 4/04* (2006.01)
*F21S 9/02* (2006.01)
*F21V 21/06* (2006.01)
*F21V 23/04* (2006.01)
*F21W 111/00* (2006.01)
*F21Y 113/13* (2016.01)
*F21Y 113/20* (2016.01)
*F21Y 115/10* (2016.01)

(52) U.S. Cl.
CPC ............ *F21V 23/0407* (2013.01); *B60Q 1/00* (2013.01); *F21L 4/04* (2013.01); *F21S 9/02* (2013.01); *F21V 23/04* (2013.01); *F21V 21/06* (2013.01); *F21W 2111/00* (2013.01); *F21Y 2113/13* (2016.08); *F21Y 2113/20* (2016.08); *F21Y 2115/10* (2016.08)

(58) Field of Classification Search
CPC .... F21V 21/145; F21V 23/0407; F21V 21/28; F21V 21/30; F21L 4/04
See application file for complete search history.

(56) References Cited

U.S. PATENT DOCUMENTS

| 4,467,263 | A | 8/1984 | Conforti et al. |
| 6,099,141 | A | 8/2000 | Landamia |
| 6,260,985 | B1 * | 7/2001 | Zeller ........................ F21L 2/00 362/157 |
| 6,857,756 | B2 | 2/2005 | Reiff et al. |
| 7,591,572 | B1 * | 9/2009 | Levine .................... A47F 11/10 362/191 |
| 7,954,980 | B2 | 6/2011 | Bryant et al. |
| 8,201,979 | B2 | 6/2012 | Deighton et al. |
| 8,777,446 | B2 | 7/2014 | Sharrah et al. |

(Continued)

*Primary Examiner* — William N Harris
(74) *Attorney, Agent, or Firm* — Barber Legal; Craig Barber

(57) ABSTRACT

An emergency, camping, flood, home, work and law enforcement light has a large LED floodlight mounted by a two-dimensional hinge to a large battery/vehicular battery case, so when the case is on the ground, the light may be directed at any angle in both bearing and azimuth. The case further may have a light strip composed of numerous small LEDs capable of various modes of blinking operation in various colors, so as to mimic, in the dark, the appearance of emergency vehicles, for example with blinking orange lights, blinking red and blue lights and so on. The vehicle battery may provide power to a 12V/30V outlet of the case, or may be charged by the same socket.

15 Claims, 12 Drawing Sheets

(56) References Cited

U.S. PATENT DOCUMENTS

| | | | | |
|---|---|---|---|---|
| 9,810,408 B2* | 11/2017 | Fang | ........................ | F21V 21/06 |
| 9,816,661 B2* | 11/2017 | Sharrah | .................. | F16M 11/28 |
| 10,001,252 B2* | 6/2018 | Inskeep | ................. | H02J 7/0052 |
| 2003/0161135 A1* | 8/2003 | Hernandez | ............... | B60Q 7/00 |
| | | | | 362/12 |
| 2007/0030672 A1* | 2/2007 | Offiler | ........................ | F21L 4/04 |
| | | | | 362/198 |
| 2011/0255274 A1* | 10/2011 | Coleman | ................... | F21L 4/02 |
| | | | | 362/183 |
| 2013/0265780 A1* | 10/2013 | Choksi | .................. | F21V 21/145 |
| | | | | 362/373 |
| 2015/0054336 A1 | 2/2015 | Xinfang | | |
| 2016/0341407 A1* | 11/2016 | Manfred | ............... | F21V 21/145 |
| 2016/0356439 A1* | 12/2016 | Inskeep | ................. | H02J 7/0052 |
| 2017/0082250 A1* | 3/2017 | Heilbrun | ................... | F21L 4/08 |
| 2018/0058673 A1* | 3/2018 | Fang | ........................ | F21V 27/02 |

* cited by examiner

SAFETY LIGHT FOR LAW ENFORCEMENT AND ROAD-SIDE EMERGENCY

CROSS-REFERENCE TO RELATED APPLICATIONS

This application claims the priority and benefit of copending U.S. Provisional Patent Application No. 62/388,966, having the same title SAFETY LIGHT FOR LAW ENFORCEMENT AND ROAD-SIDE EMERGENCY, and the same inventor Kyle Thomas Cate, filed on Feb. 12, 2016, the entirety of which is incorporated herein by this reference.

STATEMENT REGARDING FEDERALLY FUNDED RESEARCH

This invention was not made under contract with an agency of the US Government, nor by any agency of the US Government.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

FIELD OF THE INVENTION

This invention relates generally to portable lights, and specifically to lights for use by law enforcement personnel at road-side.

BACKGROUND OF THE INVENTION

Roadside lights tend to be either large ungainly structures, such as the "saw horse" type used near road construction, or small and quite weak handheld types which are easily portable but not easily seen.

However, when stopping beside the road, a law enforcement officer, a stranded motorist or a road worker has a number of needs which an emergency light or work light should meet.

Firstly the light must provide a very bright floodlight type illumination over a scene. If a car is broken down, the car needs to be illuminated. If events are occurring by the side of the road, the scene of the events should be visible, and so on.

Secondly, the light should be long-lasting. While there is utility in a brief light, such as the light provided by a smaller road flare, the illumination limitations of such short term light sources are obvious.

Thirdly, the light should serve to alert oncoming motorists. Motorists can easily ignore a light as small as a typical flashlight, or even ignore a very bright light pointed straight at them. To provide a real alert function, a light should have some "human engineering" characteristics: an alert light should be of a type which penetrates the driver's consciousness instantly.

In addition, power options on an emergency light should lend it to use, both for being charged and for being used to provide charge, under a wide range of portable/outdoor conditions. Whatever form of feet or supports are provided should allow for irregular surfaces such as road shoulders.

One example of the portable flood light may be found at http://www.ebay.com/itm/Portable-Rechargeable-Flash-24-LED-Work-trouble-Light-flood-Lamp-Camping-Battery-/401022281730?var=&hash=item9c1fe62519, which shows a portable light with 24 LEDs, a large battery, and a wall charger for 120 VAC charging. It can even flash as a red alternating with blue flood light. However, the device has a one dimensional hinge mechanism, cannot be used with vehicle charging systems, cannot serve as a power outlet, and most importantly does not mimic the action of a police car light bar or emergency vehicle warning light.

U.S. Pat. No. 6,857,756, Feb. 22, 2005 in the name of Reiff et al, teaches an LED worklight which has multiple power sources but is not adapted for use on an irregular surface, lacks features for emergency or roadside work, etc.

U.S. Pat. No. 6,099,141 to Landamia on Aug. 8, 2000 teaches a flashlight of traditional shape with a leg arrangement to hold one end up. This elevates the weight of the batteries, seems likely to be unstable, lacks various features for law enforcement work and so on.

U.S. Pat. No. 8,777,446 to Sharrah et al on Jul. 15, 2014, teaches a portable light and head which may pivot in reference to its base but once again has elevated batteries, a narrow base, no provision for mimicking law enforcement/warning lights, and so on.

US Patent Publication No. 20150054336 to Xinfang, published Feb. 26, 2015, at least teaches a power bank which is portable and of a solid, low shape, however, it seems to have no relevance to law enforcement or emergency work due to lacking various structures, and it does not seem adapted for outdoor high stress work in terms of structural strength.

U.S. Pat. No. 7,954,980 to Bryant et al on Jun. 7, 2011 is a very interesting artistic design with LED light arrays in wings and elevated batteries in a narrow case.

U.S. Pat. No. 8,201,979 (Jun. 19, 2012) to Deighton et al is another device which lifts the batteries off the ground on legs having potential for possible stability and a light which can pivot relative to the vertical axis of the main body.

Www.streamlight.com/it-it/product/product.html?pid=284 ("E-Flood® LiteBox® HL™") (sic) teaches a light having an array of LEDs and a reasonably low rectangular body with a handle on top. It does not teach having the light sit atop the body, and the light only pivots in one dimension. In addition it lacks features for use by road-side, camping, etc.

U.S. Pat. No. 4,467,263 to Conforti et al on Aug. 21, 1984 teaches a rechargeable wall mounted flashlight.

It would be advantageous to provide a very bright light for emergency use, for camping, for shop work, road work, car work and the like, which is bright, long-lasting, truly portable, and easy to manufacture.

It would further be advantageous to provide a light having a very durable case with feet for use on uneven road surfaces, structural reinforcement to the case, 2 or 3 dimensional swivel mounting between the case and the floodlight so that the light can be aimed as desired even if the case must be placed in a disadvantageous posture and so on.

It would further be preferable to provide a light which would serve as an alert to oncoming traffic that an event requiring caution was in progress, and that would trigger driver's automatic reflexes regarding the appearance of colored blinking lights.

It would yet further be preferable to provide a light which would act as a portable power source and could be recharged by a variety of methods, including standard 12V/30V/42V automobile electrical connectors and standard building AC current (115 VAC US or other quantities such as 240 VAC in nations using higher voltages).

It would yet further be preferable to provide a light which has convenience features such as smart switches indicating charge levels in use, multiple flood light power levels, and so on.

SUMMARY OF THE INVENTION

General Summary

The present invention teaches an emergency, camping, flood, home, work and law enforcement light which has a large LED floodlight mounted by a two-dimensional hinge to a large battery/vehicular battery case. The hinge allows the light to be adjusted both in direction (bearing) and in elevation (azimuth), so when the case is on the ground, the light may be directed at any angle in both directions. The case is made of thicker material with reinforcement ridges and ribs so that it may sustain the weight of various components, which includes not only the large floodlight but also a vehicle battery.

The light may have embodiments with a second light source of a different nature: a light strip composed of numerous small LEDs capable of various modes of blinking operation in various colors, so as to mimic, in the dark, the appearance of emergency vehicles, for example with blinking orange lights, blinking red and blue lights and so on. For example, a solid bar of blinking orange (amber) will mimic the appearance of a work vehicle stopped by the side of the road, while fast blinking lights in red and blue will mimic the appearance of the light bar (flashing lights) atop a police vehicle.

This last item is fairly important to that embodiment. Drivers are conditioned to trigger alert instantly when they catch sight of flashing red and blue lights which blink the pattern used by local law enforcement. By providing this pattern, the secondary light strip of the invention allows a law enforcement officer out of his vehicle by the roadside to "trigger" drivers' brains with the portable light placed down the road or out into a traffic lane or otherwise for increased visibility.

In addition, since the flood light on the other end of the case can pivot in two dimensions, the officer may adjust the floodlight to illuminate a scene (such as a car accident) while the light bar is alerting drivers. Since the light is portable and noticeably less expensive than a police cruiser, it can be advantageously placed right out in the traffic lanes, unlike a police vehicle, thus gaining a better angle for being viewed by oncoming traffic.

The vehicle battery inside of the case may provide power to a 12V outlet of the case, or may be charged by the same socket, either from a vehicle power outlet (using a male to male cord), or by a vehicle battery (using a alligator clip jumper cable to male cord), or by means of an AC adapter to vehicle DC cord. In embodiment it might be possible to fuse the device so that it can be used as a portable jump station for vehicles with dead batteries.

While the terms "12V" and "12 VDC" are used extensively herein, it will be understood that in fact vehicle power, especially in the near future, may be at other voltages. 30V is especially contemplated as another standard vehicle power level, 42V is possible and so on and so forth. Thus for this application 12V may be taken to mean "standard vehicle voltage".

It may also be used as a work light under the hood of a vehicle, attached to a vehicle battery as a source of electricity.

The invention may be used advantageously for camping, as a trouble light, a work light, an event light and more.

SUMMARY IN REFERENCE TO CLAIMS

It is therefore another aspect, advantage, objective and embodiment of the invention, in addition to those discussed previously, to provide a portable light comprising:

an LED floodlight;

a battery case having a top half and a bottom half, the LED floodlight mounted to the battery case top half by a two dimensional hinge allowing relative motion of the LED floodlight to the battery case in both bearing and azimuth;

a battery disposed within the battery case;

wiring providing an operative electrical connection between the battery and the LED floodlight;

a power switch having two positions, in a first position the electrical current flow from battery to LED floodlight is allowed and in a second position the electrical current is disconnected;

the bottom half to the battery case being dimensioned and configured whereby the bottom half may be used as a base.

It is therefore another aspect, advantage, objective and embodiment of the invention, in addition to those discussed previously, to provide a portable light for use on surfaces out of doors, the portable light further comprising:

feet disposed upon the bottom half of the battery case, whereby the battery case may be rested on such surfaces out of doors.

It is therefore another aspect, advantage, objective and embodiment of the invention, in addition to those discussed previously, to provide a portable light for use with devices powered by 12V DC vehicular power sockets, the portable light further comprising:

a 12V DC vehicular power socket passing through the battery case, the 12V DC vehicular power socket having an operative electrical connection to such wiring, whereby such devices powered by 12V DC vehicular power sockets may be plugged into such portable light and powered thereby.

It is therefore another aspect, advantage, and embodiment of the invention, in addition to those discussed previously, to provide a portable light wherein the battery comprises:

a vehicular battery selected from the group consisting of: motorcycle batteries, car batteries, truck batteries, marine batteries, and combinations thereof.

It is therefore another aspect, advantage, objective and embodiment of the invention, in addition to those discussed previously, to provide a portable light further comprising:

an LED strip comprising a plurality of small colored LEDs;

a power switch having an operative electrical connection to the wiring and to the LED strip;

a mode selection switch controlling the LED strip, the mode selection switch also having an operative electrical connection to the LED strip.

It is therefore another aspect, advantage, objective and embodiment of the invention, in addition to those discussed previously, to provide a portable light wherein the colored LEDs comprise colors selected from the group consisting of: red, blue, amber, white, and combinations thereof.

It is therefore another objective, aspect, advantage, and embodiment of the invention, in addition to those discussed previously, to provide a portable light for use with emergency/law enforcement vehicles having blinking light bars, wherein such mode selection switch has at least a first mode operative to cause the LED light strip LEDs to blink in a manner mimicking the blinking of such emergency/law enforcement vehicle blinking light bar.

It is therefore another aspect, advantage, objective and embodiment of the invention, in addition to those discussed previously, to provide a portable light for use with a 12V power socket, further comprising:

a 12V power cord having male connectors at both ends, whereby the battery may be charged/used for power by plugging the 12V power cord into both the 12V power socket of the case and such 12V power socket.

It is therefore another aspect, advantage, objective and embodiment of the invention, in addition to those discussed previously, to provide a portable light further comprising;

an AC power cord having an AC electrical plug at one end, operatively connected to an AC to 12V DC power converter and thence to a 12V male connector.

It is therefore another advantage, objective, aspect and embodiment of the invention, in addition to those discussed previously, to provide a portable light for use with a vehicle having a vehicle battery having terminals, the portable light further comprising:

a 12V power cord having a male connector at one end and a pair of alligator clips at the other end, whereby the battery may be charged/used for power by plugging the 12V power cord into the 12V power socket of the case and applying the pair of alligator clips to such vehicle battery terminals.

It is therefore another aspect, advantage, objective and embodiment of the invention, in addition to those discussed previously, to provide a portable light wherein such wiring further comprises:

a fuse.

It is therefore yet another aspect, advantage, objective and embodiment of the invention, in addition to those discussed previously, to provide a portable light wherein the case further comprises:

ribs providing structural support.

It is therefore yet another aspect, advantage, objective and embodiment of the invention, in addition to those discussed previously, to provide a portable light wherein the power switch further comprises a third setting in which partial current is allowed to flow.

It is therefore yet another aspect, advantage, objective and embodiment of the invention, in addition to those discussed previously, to provide a portable light wherein the colored LEDs comprise colors selected from the group consisting of: yellow, orange, pink, purple, green, UV, IR, full spectrum, and combinations thereof.

It is therefore yet another aspect, advantage, objective and embodiment of the invention, in addition to those discussed previously, to provide a portable light wherein the power switch further comprises:

a current detector operative to measure the current remaining in the battery;

a multi-colored power-level LED light disposed at the power switch, the multi-colored power-level LED light operative to display a first color when the LED flood light is turned on and the current detector finds that the battery has at least a first level of current, and to display a second color when the LED flood light is turned on and the current detector finds that the battery has at least a second level of current.

It is therefore yet another aspect, advantage, objective and embodiment of the invention, in addition to those discussed previously, to provide a portable light wherein multi-colored power-level LED light is further operative to display a third color when the LED flood light is turned on and the current detector finds that the battery has at least a third level of current, and to display no light when the LED flood light is turned off.

It is therefore yet another aspect, advantage, objective and embodiment of the invention, in addition to those discussed previously, to provide a portable light wherein the LED strip is mounted to a side of the battery case.

It is therefore yet another aspect, advantage, objective and embodiment of the invention, in addition to those discussed previously, to provide a portable light, wherein the LED strip is mounted to a rear of the LED flood light.

It is therefore yet another aspect, advantage, objective and embodiment of the invention, in addition to those discussed previously, to provide a portable light an LED floodlight;

a battery case having a top half and a bottom half, the LED floodlight mounted to the battery case top half by a two dimensional hinge allowing relative motion of the LED floodlight to the battery case in both bearing and azimuth, the battery case having ribs providing structural support;

a vehicular 12V battery disposed within the battery case;

wiring providing an operative electrical connection between the battery and the LED floodlight;

a 12V DC vehicular power socket passing through the battery case, the 12V DC vehicular power socket having an operative electrical connection to such wiring, whereby such devices powered by 12V DC vehicular power sockets may be plugged into such portable light and powered thereby a power switch having two positions, in a first position the electrical current flow from battery to LED floodlight is allowed and in a second position the electrical current is disconnected;

the bottom half to the battery case being dimensioned and configured whereby the bottom half may be used as a base having feet disposed upon the bottom half of the battery case, whereby the battery case may be rested on such surfaces out of doors;

an LED strip comprising a plurality of small colored LEDs, mounted to the rear of the LED flood light;

a LED power switch having an operative electrical connection to the wiring and to the LED strip;

a mode selection switch controlling the LED strip, the mode selection switch also having an operative electrical connection to the LED strip.

INDEX TO REFERENCE NUMERALS

Figure 1:
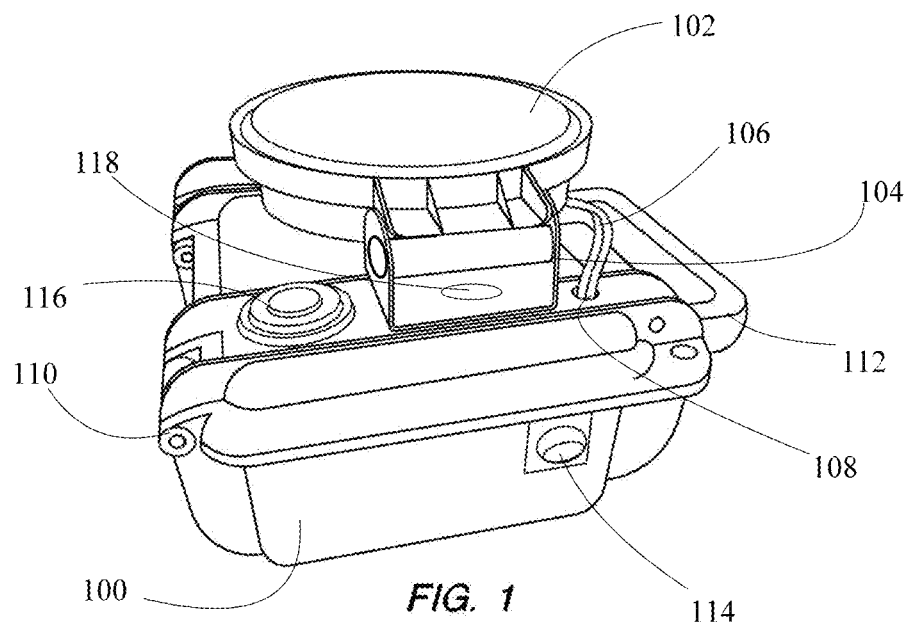
FIG. 1 is an elevated perspective offset front diagram of a first embodiment of the device.

Base/battery holder case 100
Flood light 102
2D Hinge 104
Power cord 106
Power cord case aperture 108
Case hinge 110
Handle 112
Power switch, flood light 114
12V power socket 116
Hinge bolt 118
Reinforcement rib 120
Case top half 122
Case bottom half 124
Vehicle battery 126
Wiring 128
Foam/padding 130
Feet 132
Light bar 134
Light bar selection switch 136
Light bar power switch 138
Cooling fins 140
Vehicle battery 200
LED floodlight power switch 202
LED lightstrip power switch 204
LED floodlight 206
LED lightstrip 208
LED lightstrip behavior selection switch 210
12V power socket 212
Fuse 214
Wire join 216
Base/battery holder case 800
Flood light 802
Light bar 850
Smart switch 1138
Smart switch, off position 1138'
Multicolor LED 1160
Roadway 1200
Obstacle 1204
Flood lit illuminated zone 1206
Blinking light warning 1208
Oncoming traffic 1210
Headlight loom 1212
G, A, R First, second and third colors

DETAILED DESCRIPTION

In the presently preferred embodiment and best mode presently contemplated for carrying out the invention, FIG. 1 is an elevated perspective offset front diagram of a first embodiment of the device.

Base/battery holder case 100 may be of any extremely durable construction. The presently preferred embodiment is quite thick polymer with two latches disposed under the folding carrying handle and foam inserts which prevent the contents of the case (a heavy battery) from shifting or banging during transportation. Reinforcement ribs 120 are provided and serve a dual purpose: increasing the strength of the case (which must hold a heavy vehicle battery) but also serving as feet should the provided feet fall off or be removed. The provided feet allow for better and more stable positioning out of doors on surfaces such as roadways, shoulders, sidewalks and open ground, all of which tend to be somewhat irregular. Rubber or durable polymers may be used for the feet in embodiments. The feet may have small magnets, or a large powerful magnet may be provided as part of the case. This may allow the device to be placed and stabile on a car top or on the sled of a tow truck, providing additional illumination under the towed vehicle. The feet may extend, may rotate, the device may rotate on the feet, the feet may be removable (for example snapping on and off), may be stored in the case on clips on the side of the case when not attached as feet, and so on and so forth.

In addition, the stability of the light is greatly enhanced by providing a low, prism shaped (rectanguloid) case with a large battery horizontally disposed within: the result is the maximally stable configuration, in contrast to many other designs with legs extending downward from an elevated light. The round and light flood light 102 of the invention is the only part which projects above the rectanguloid, low, broad, heavy base.

Flood light 102 may advantageously be an extremely bright LED configuration or can be any number of LEDs suitable for the desired light output, battery endurance and other characteristics, for example, a pattern of 9 very high intensity LEDs may be used in one embodiment and other numbers of other types in other embodiments. The floodlight is somewhat directional in the best mode now contemplated: an omnidirectional light will tend to blind anyone in the vicinity any time their eyes happen to pass over it. A narrowly focused floodlight may be too narrowly focused, so in the best mode now contemplated the light is flat array form but the individual HILED elements are moderately directional, resulting in a useful compromise between narrow beam and omnidirectional. In alternative embodiments, narrower beam floodlights may be used, omnidirectional lights may be used in place of floodlights and so on.

2D Hinge 104 is important to the invention because it may be desirable to place the light in a certain location for reasons other than optimizing light from the flood light. For example, it may be desirable to place the device in a traffic lane for extreme visibility to drivers (without endangering a law enforcement vehicle by placing it in a line of traffic). The bearing and azimuth hinge (which in the best mode now contemplated is a bracket with a first bolt passing across it as an axle and a second bolt (hinge bolt head 118) passing perpendicularly down through it into the case, but which may be any type of two dimensional hinge) allows the floodlight LED to point in any direction after placement of the device.

Power cord 106 is flexible and passes out of the case 100 via power cord case aperture 108, which in embodiments may have a grommet to provide waterproofing of the aperture.

Case hinge 110 and handle 112 may be used for opening the case or carrying it as appropriate.

Power switch 114 is for the flood light 102. It may have two positions, one position in which electrical current may flow from the interior wiring (and the battery) to the floodlight and a second position in which current may not flow. In alternative embodiments, it may have a third position in which it allows partial current to flow, thus providing a "off-lo-high" brightness capability, with the "lo" setting allowing longer battery life. In embodiments it might even be a variable light switch, although this may not be appreciated under emergency circumstances and is thus a less desirable alternative embodiment presently.

12V power socket 116 (a "car power outlet") is a standard type allowing other 12V devices to be plugged into the light and use it as a power source. For example, another light (that is, a third light in the embodiment of FIG. 6) might be plugged in, or a handheld light, or the like.

Figure 2:
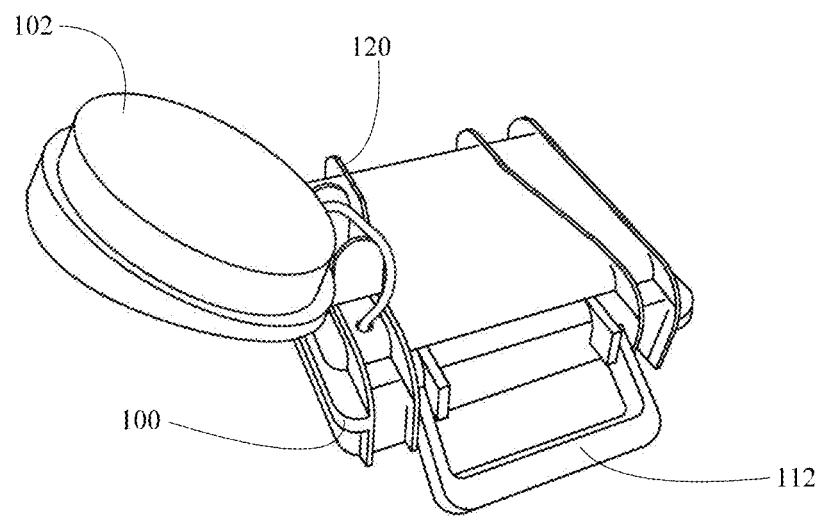
FIG. 2 is an elevated perspective offset side view diagram of the first embodiment of the device.

FIG. 2 is an elevated perspective offset side view diagram of the first embodiment of the device. The light is shown in one possible configuration of use, with the alignment approximating that of the case, such as might happen if the device were placed directly behind a vehicle to be illuminated.

Figure 3:
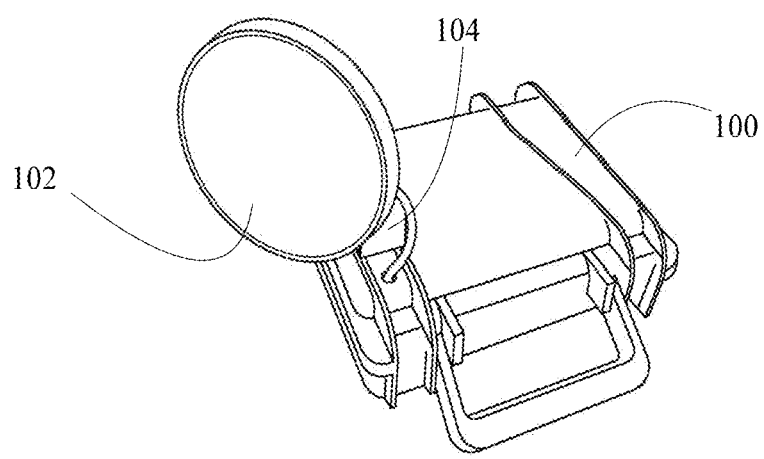
FIG. 3 is an elevated perspective offset side view diagram of the first embodiment of the device.

FIG. 3 is an elevated perspective offset side view diagram of the first embodiment of the device. In this view the light has been twisted to one side (see hinge bolt 118 discussed in reference to FIG. 1) and thus the light might be offset from the place it is illuminating, for example, if law enforcement personnel wish to have the light providing illumination to events on the side of the road while the lights is actually sitting out into traffic, which might be desirable for the embodiment having a red and blue LED light bar on the back side. It is sometimes desirable for emergency workers and law enforcement personnel to have something extremely eye-catching to deliberately place slightly or wholly encroaching on a traffic lane, in order to reduce danger to people forced to be by the side of the road or actually in a lane of traffic.

Figure 4:
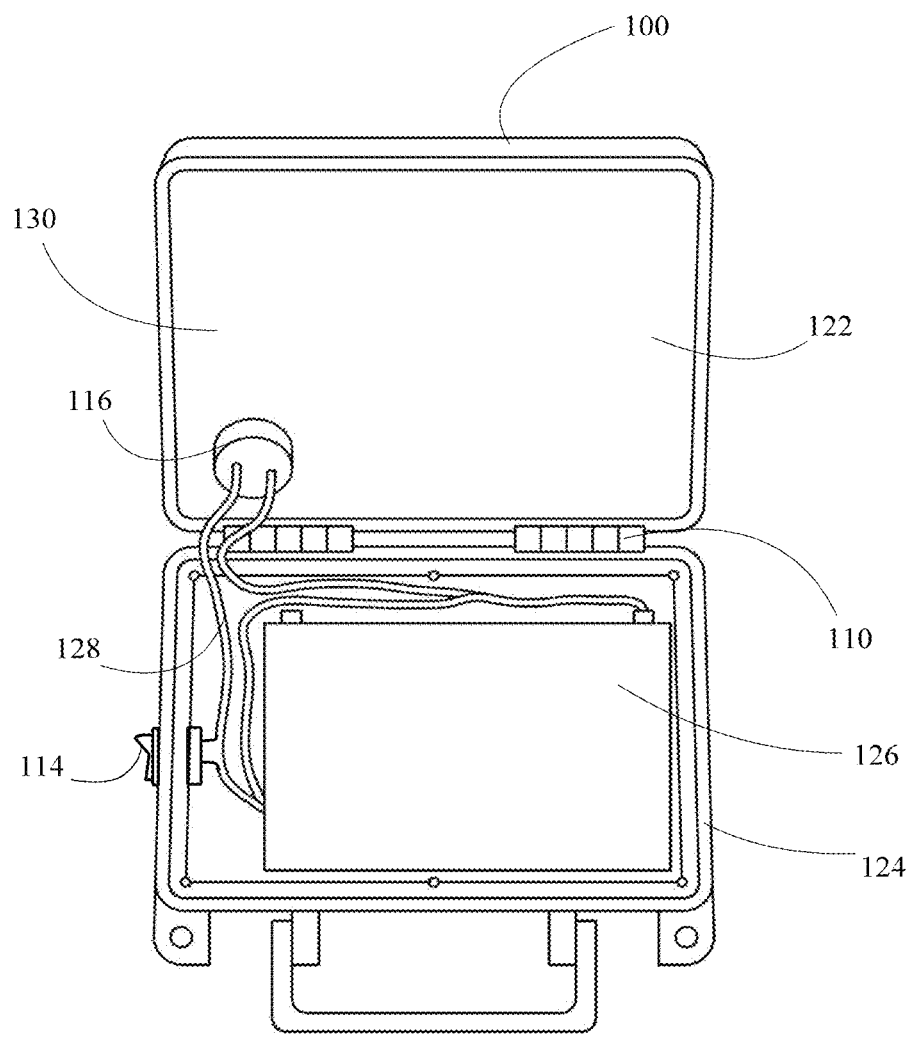
FIG. 4 is a top view diagram showing the case of the first embodiment of the invention opened up, whereby a basic interior layout may be seen.

FIG. 4 is a top view diagram showing the case of the first embodiment of the invention opened up, whereby a basic interior layout may be seen.

Case top half 122 and case bottom half 124 may either open as shown or close to form a sealed case as per the previous diagrams. The case hinge 110 (not the light hinge 104) provides this capability.

Foam/padding 130, as noted earlier, provides against shifting of the battery or other components of the interior. This may not seem important but a vehicle battery banging back and forth even a single centimeter will swiftly destroy even the toughest case.

Vehicle battery 126 is pictured as a smaller type, such as a motorcycle battery, however, it may be any rechargeable battery such as a car battery, truck or marine battery or the like.

Figure 5:
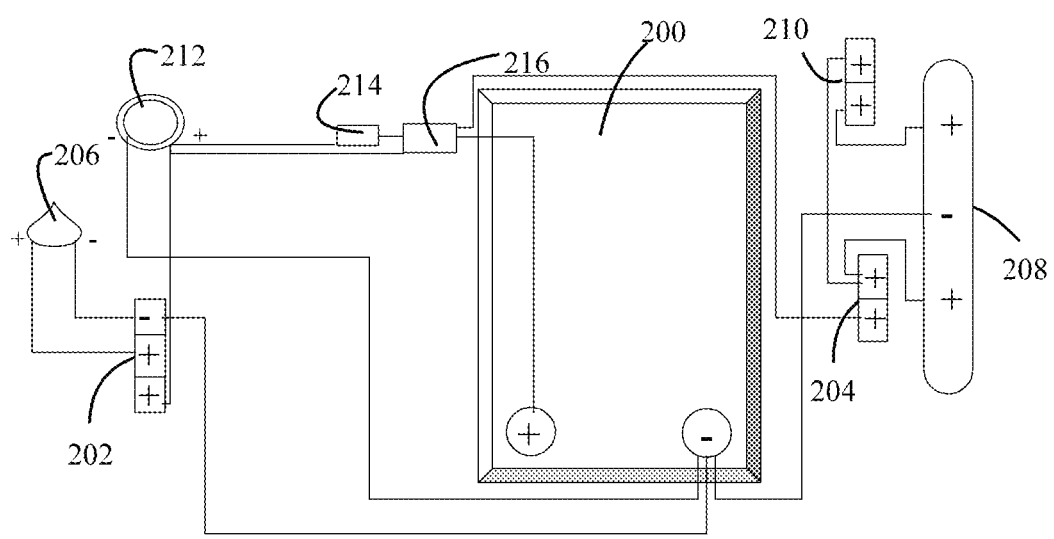
FIG. 5 is a block diagram of a simplified circuit diagram of a second embodiment of the invention.

Wiring 128 may provide an operative electrical connection between all other electrical components listed, and is further discussed in reference to the next figure, FIG. 5.

FIG. 5 is a block diagram of a simplified circuit diagram of a second embodiment of the invention. Vehicle battery 200 provides electrical current via the wiring and via LED floodlight power switch 202 and LED lightstrip power switch 204 to either/both of LED floodlight 206 and LED lightstrip 208.

LED lightstrip behaviour selection switch 210 on the other hand controls the behavior of the light strip, in particular, the flash pattern. The light switch 210 may allow access to a very large number of flash modes, by which means emergency and law enforcement personnel can best impersonate the behavior of their car top light bars and thus best trigger oncoming drivers' alert reflexes. In embodiments, the light may automatically be activated (come on) in the same setting in which it was last used, so that an emergency worker can adopt a setting mimicking local alert light behavior on cartop light bars, then simply turn it on and off without need to spend time hunting for the best setting each time it is turned on again.

In one presently preferred embodiment, the LED/wiring may provide about 17 modes of flashing, resulting in a wide array of car top light bar imitation abilities.

12V power socket 212 may be the interior wiring leading to physical socket 116 seen in FIG. 1.

Fuse 214 may provide obvious protection against undesirable electrical behavior. Wire join 216 simply provides an easy and reliable method of joining/dividing current.

Figure 6:
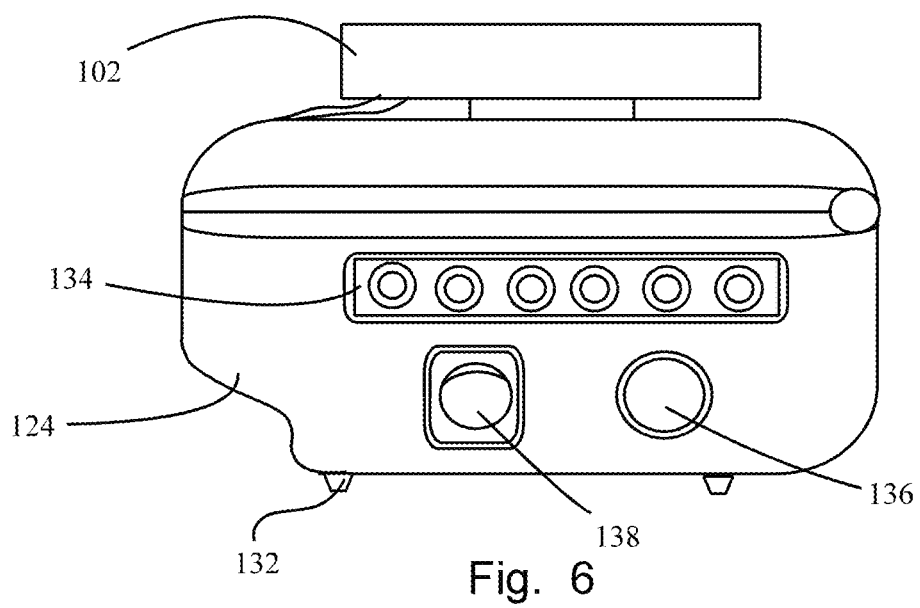
FIG. 6 is a rear view of a third embodiment of the invention showing an LED strip mimicking, in the dark the appearance of a law enforcement vehicle.

FIG. 6 is a rear view of a third embodiment of the invention showing an LED strip which mimics (in the dark at least) the appearance of a law enforcement vehicle.

Feet 132, as discussed earlier, allow the device to be more securely placed on road surfaces, campgrounds and the like.

Light bar 134 and light bar selection switch 136 and light bar power switch 138, as discussed earlier, allow the device to be used to effectively mimic car top light bars.

Figure 7:
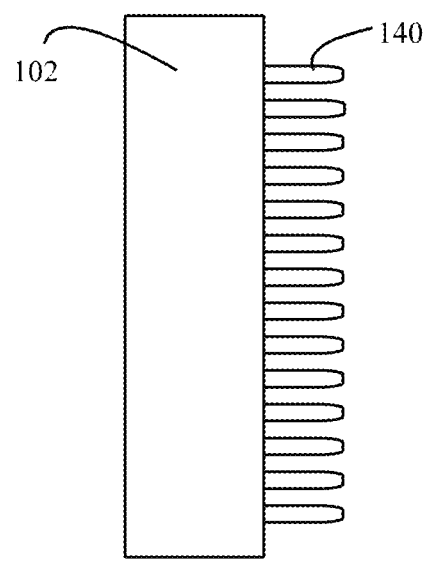
FIG. 7 is a top view of the LED floodlight of a fourth embodiment of the invention showing cooling fins on the back of the LED floodlight.

FIG. 7 is a top view of the LED floodlight of a fourth embodiment of the invention showing cooling fins on the back of the LED floodlight. Cooling fins 140 may be advantageous in embodiments in which the LED floodlight becomes extremely hot. As is well known, LED lights use less electricity, however they do generate rather surprising amounts of heat, more akin to a incandescent bulb than to a fluorescent (neither of which they are related to). Cooling apparatus has another advantage in that as temperature goes down, LED life-span is increased.

Figure 8:
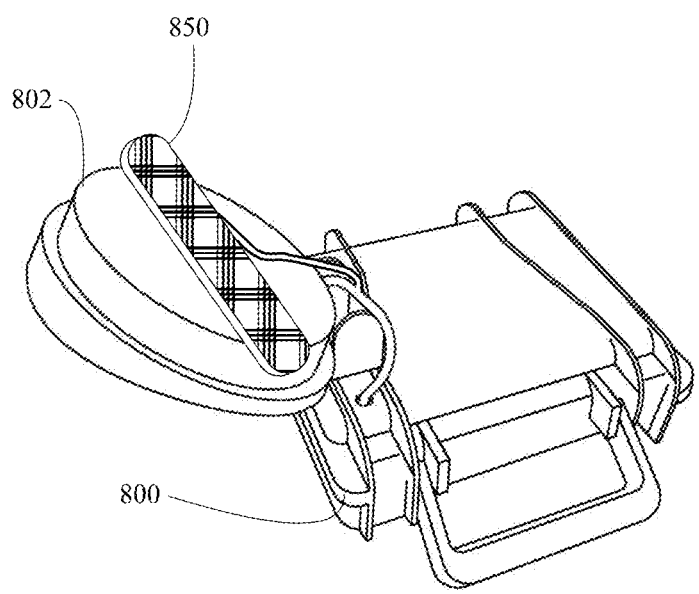
FIG. 8 is an elevated perspective offset side view diagram of the fifth embodiment of the device.

FIG. 8 is an elevated perspective offset side view diagram of the fifth embodiment of the device. Base/battery holder case 800 once again features the flood light 802 on a swiveling mounting offering at least 2 degrees of freedom, however in this case the back of the LED floodlight has the LED light bar 850 on it.

This will raise the LED light bar 850 off the ground, increasing the range of visibility of the blinking LEDs, as well as potentially providing simpler wiring layouts, as the LED light bar wiring may be at least partially wrapped with the LED floodlight wiring. In addition, this allows the swiveling of the floodlight to be used to swivel the LED light bar on the back of the flood light.

On the other hand, this embodiment means that the LED floodlight and the LED light bar must always be exactly 180 degrees opposed to one another.

Figure 9:
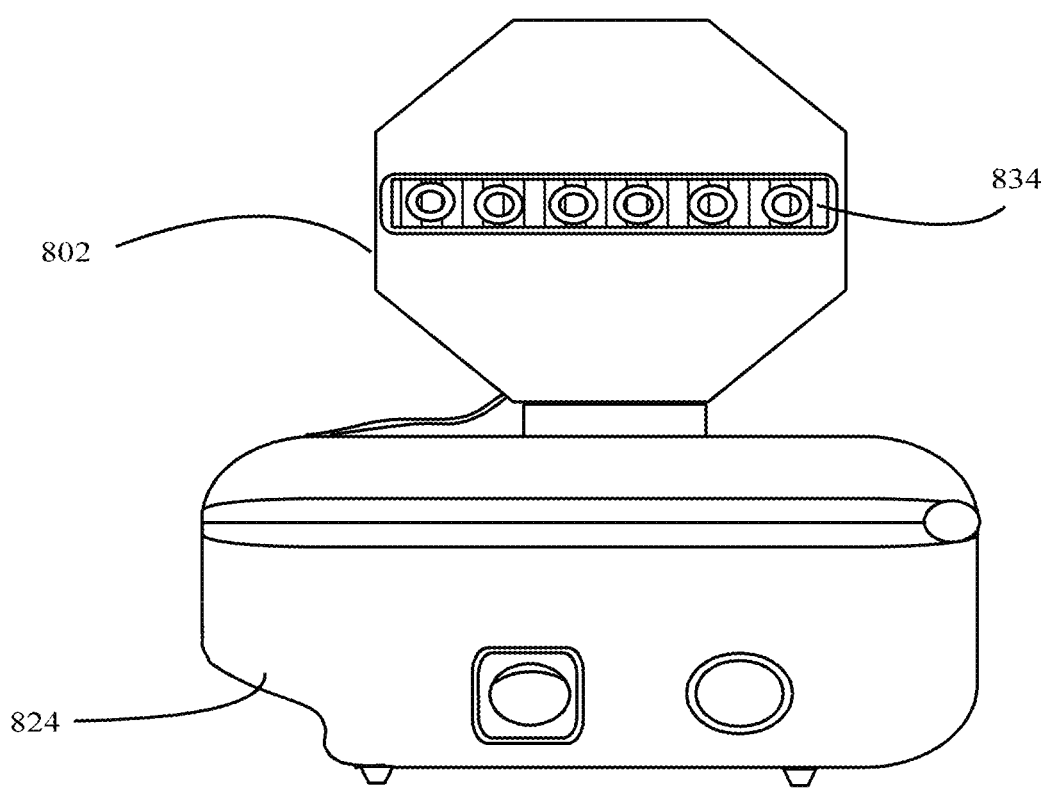
FIG. 9 is a rear view of a sixth embodiment of the invention showing an LED strip mimicking the appearance of a law enforcement vehicle light bar, mounted in this embodiment on the back of the flood light.

FIG. 9 is a rear view of a sixth embodiment of the invention showing an LED strip mimicking the appearance of a law enforcement vehicle light bar, mounted in this embodiment on the back of the flood light. Case bottom half 824, on which the light bar 834 had been mounted in previous embodiments, may be seen to be lower than the flood light's rear side.

In this embodiment a different type of flood light is employed: a wide range of flood lights may be used in the various embodiments of the invention.

Flood lights may be square in shape, or octagonal, hexagonal, star-shaped, or have any shape or configuration. The individual LEDs may be of various shapes and hues, and may be arranged in a given shape, or the overall flood light LED housing may be the different shape, as shown in this figure in which the LED housing is octagonal. In addition the flood lights of the invention may be adjusted by color spectrum (bright white light, bluish white light, sun spectrums, single colors other than white, polychromatic (much like stage lighting)) and may have other variations, blinking, moving, rotating, etc.

Figure 10:
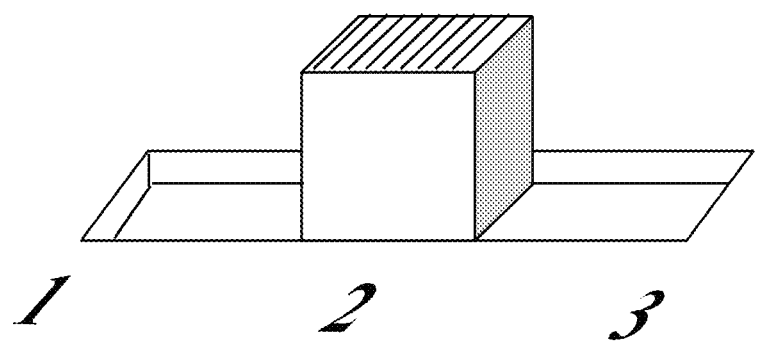
FIG. 10 is a perspective view of a three-position switch.

FIG. 10 is a perspective view of a three-position switch. Positions 1, 2 and 3 (not reference numerals for this application but rather, indicia printed on the invention) allow, as noted previously, for a lower level of electricity usage and an increased life for the flood light.

In general the flood light is the largest draw of current when compared to the LED light bar which sparkles with law enforcement colors. Thus the multiple position power switch is wired to the flood light and controls the power drain of that larger light. However, in other embodiments, the LED light bar mode selection switch may have blinking/sparkling modes which also use less electricity.

Unlike previous embodiments, and unlike the best mode now contemplated and presently preferred embodiments which have low profile rocker switches, in this embodiment the switch is obviously a slide switch having a high profile.

Figure 11:
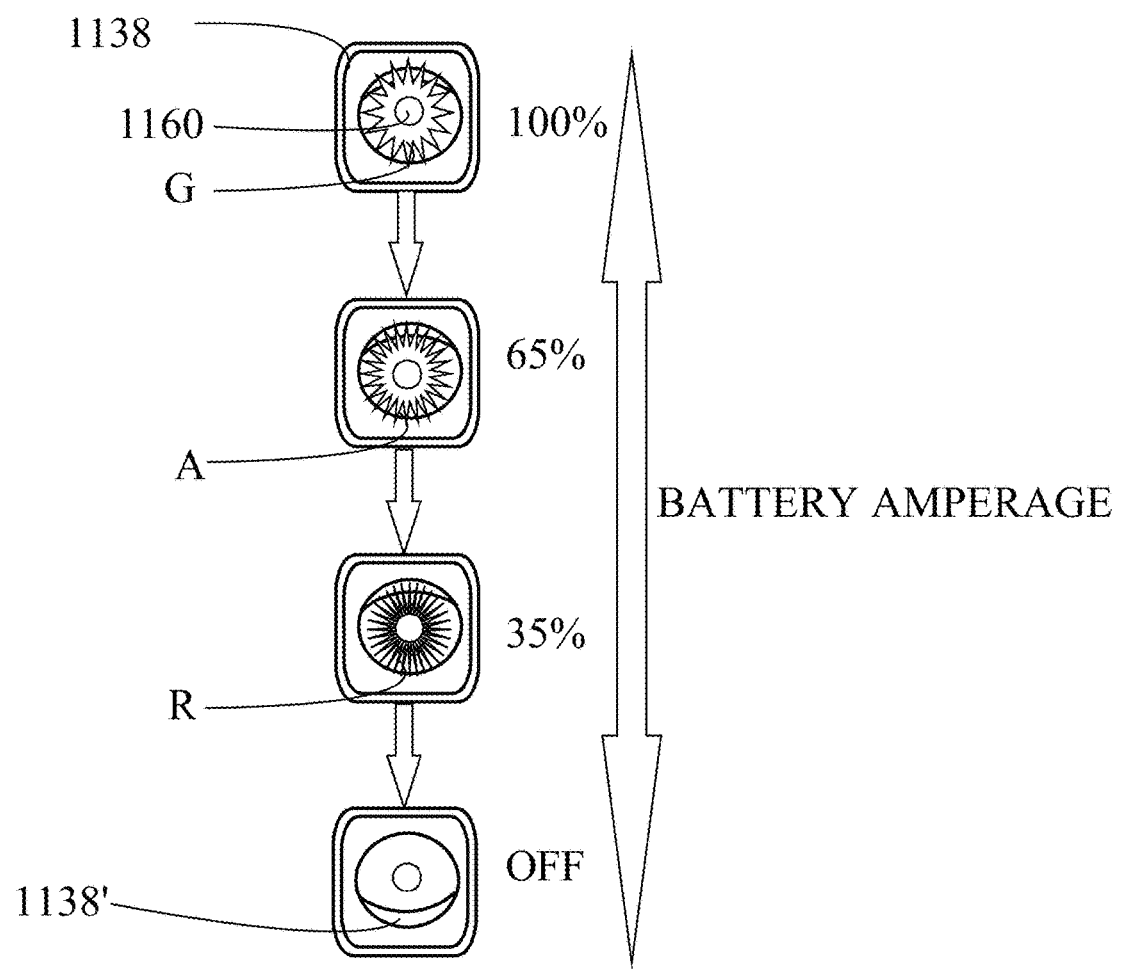
FIG. 11 is a block diagram of a single smart switch going through different light indications of different power levels.

FIG. 11 is a block diagram of a single smart switch going through different light indications of different power levels.

Smart switch 1138 may have therein a multicolor LED 1160. The multicolor LED 1160 may in turn have therein, or be attached to, a power sensor/amperage sensor operative to detect the current/amperage/power remaining in the battery. This power level sensor may for example be wired to the battery.

Multicolor LED may do various different types of multiple colors: different shades/hues of light, (green, white, blue, etc) or it may have different colors by means of intensity (bright red, red, dim red, etc), or it may have patterns of light (three blinks in a row, two blinks in a row, fast blinking, slow blinking, and so on) all of which are included within the broad term "colors" as used herein.

In the block diagram FIG. 11, the multicolor LED 1160 actually displays a first color of green G, a second color of amber A (yellow/orange) and a third color of red R, so as to coincide with traffic light colors. The green color G indicates a great deal of charge, for example, a charge amount in excess of 65%. On the other hand, at 65% or less, the amber color A would be displayed, and at 35% or less, the color R (red) would be displayed. As mentioned, "colors" in this context includes blink patterns and the like.

The smart switch may also have a battery protector cut-off. This can be built into the smart switch itself, or may be a small unit located in-line from the smart switch to the main flood light. Either way, it will monitor electricity flow (voltage flow or amperage) and cut the circuit when voltage or amperage fell below a certain threshold. For example, the cut off unit might disable power flow when voltage fell below 10 V DC, and not re-enable it until the unit is plugged in, or voltage reaches 11.3 volts, etc. The reason the smart switch or separate cut off unit would need to do this is to improve the lifespan of the battery. Occasionally, the flood light of the unit may get turned on by accident, for example, while being bumped around in the back of a truck or in a toolbox, trunk, etc. The unit's large flood light remaining on can drain the battery to an extent that the battery is actually damaged, reducing battery capacity and/or life span.

Finally, when power completely dies the LED in the smart switch will not display anything, obviously. In addition, when the smart switch is in the off position (1138'), then the smart switch may not display a light either, so as to conserve battery life. However, a smart charger may be employed for the same purpose and in the same manner when the invention is not in use.

Figure 12:
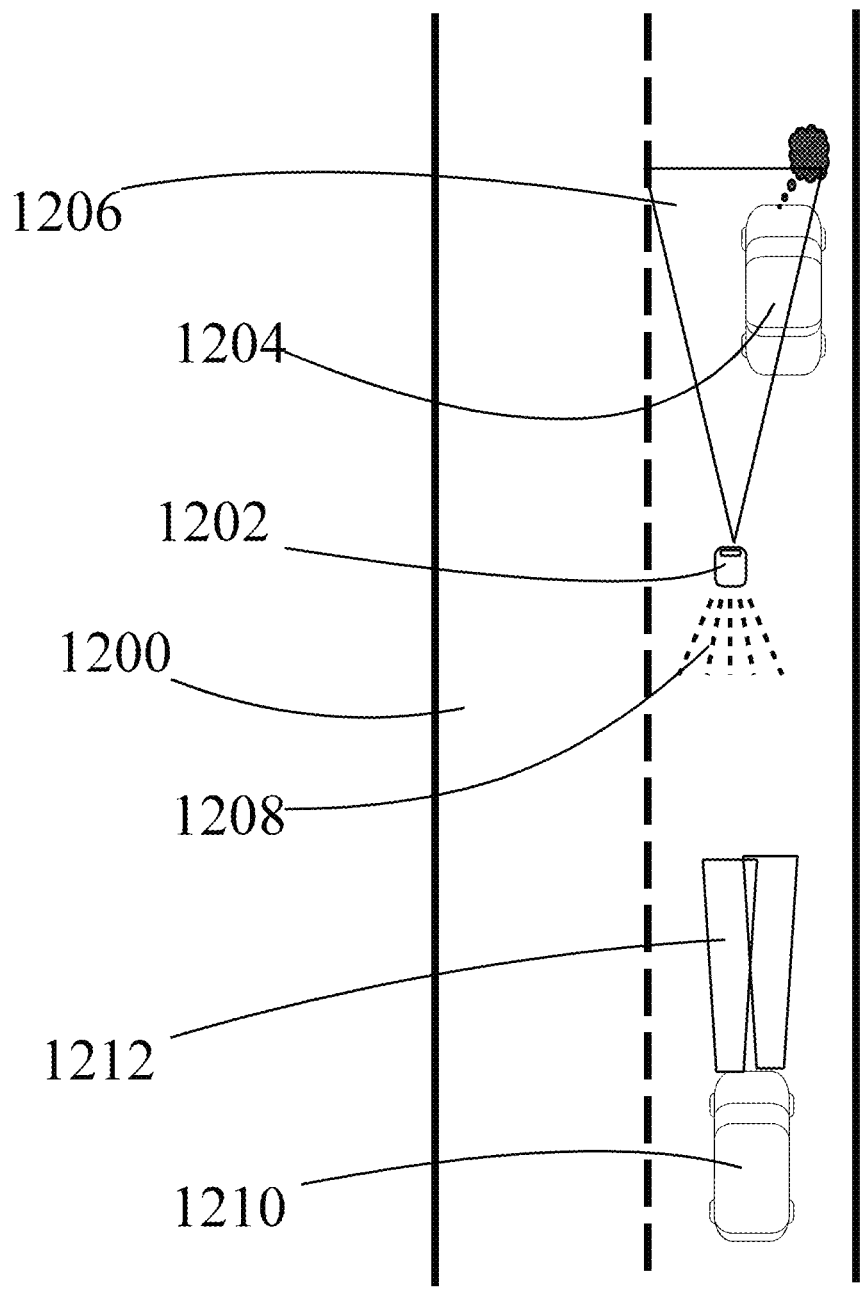
FIG. 12 is a planform view of a roadway at night with an obstacle (a broken down car) being illuminated and a law-enforcement light representation being used to warn oncoming traffic.

FIG. 12 is a planform view of a roadway at night with an obstacle (a broken down car) being illuminated and a law-enforcement light representation being used to warn oncoming traffic.

Roadway 1200 is shown with the safety light 1202 (slightly exaggerated in scale for clarity) set up with the flood light illuminating obstacle 1204. In this case the obstacle 1204 is the simplest possible scenario, a single immovable object such as a broken automobile. However, in practice, the light may be used with road-side searches and sobriety check points, other check points, traffic accident scenes, rescue scenes, law enforcement activities, and every other occurrence from flat tires to cordoning of streets for major incidents.

Flood lit illuminated zone 1206 may be seen as a triangular area from the invention 1202 and may be pointed away from oncoming traffic 1210, but the light bar emulating and reminding viewers of law enforcement is creating a blinking light warning 1208 in the direction of oncoming traffic 1210.

Oncoming traffic 1210 will hopefully have a normal headlight loom 1212, being that double-conic section of the road which is illuminated by the vehicle's own headlights, however, the visibility increase due to the use of the light bar (pointing at the oncoming traffic) and the flood light (illuminating the obstacle) is quite large.

In addition to the warning trigger provided by the LED light strip emulating a law enforcement vehicle, there is a psychological alert against impact as well. The light may be placed in the path of oncoming traffic, or partially in the path of oncoming traffic, so that as driver's approach they find themselves in danger of running over the light and perforce must take action if only to avoid damaging their own vehicle.

Throughout this application, various publications, patents, and/or patent applications are referenced in order to more fully describe the state of the art to which this invention pertains. The disclosures of these publications, patents, and/or patent applications are herein incorporated by reference in their entireties, and for the subject matter for which they are specifically referenced in the same or a prior sentence, to the same extent as if each independent publication, patent, and/or patent application was specifically and individually indicated to be incorporated by reference.

Methods and components are described herein. However, methods and components similar or equivalent to those described herein can be also used to obtain variations of the present invention. The materials, articles, components, methods, and examples are illustrative only and not intended to be limiting.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art.

Having illustrated and described the principles of the invention in exemplary embodiments, it should be apparent to those skilled in the art that the described examples are illustrative embodiments and can be modified in arrangement and detail without departing from such principles. Techniques from any of the examples can be incorporated into one or more of any of the other examples. It is intended that the specification and examples be considered as exemplary only, with a true scope and spirit of the invention being indicated by the following claims.

The disclosure is provided to allow practice of the invention by those skilled in the art without undue experimentation, including the best mode presently contemplated and the presently preferred embodiment. Nothing in this disclosure is to be taken to limit the scope of the invention, which is susceptible to numerous alterations, equivalents and substitutions without departing from the scope and spirit of the invention. The scope of the invention is to be understood from the appended claims.

What is claimed is:

1. A portable light comprising:
   an LED floodlight;
   a battery case having a top half and a bottom half, the LED floodlight mounted to the battery case top half by a two dimensional hinge allowing relative motion of the LED floodlight to the battery case in both bearing and azimuth;
   a battery disposed within the battery case;
   wiring providing an operative electrical connection between the battery and the LED floodlight;
   a power switch having two positions, in a first position the electrical current flow from battery to LED floodlight is allowed and in a second position the electrical current is disconnected;
   whereby the bottom half of the battery case is used as a base;
   an LED strip comprising a plurality of colored LEDs, the LED strip mounted to a rear side of the battery case;
   a LED power switch having an operative electrical connection to the wiring and to the LED strip;
   a mode selection switch controlling the LED strip, the mode selection switch also having an operative electrical connection to the LED strip.

2. The portable light of claim 1, for use on surfaces out of doors, the portable light further comprising:
   feet disposed upon the bottom half of the battery case, whereby the battery case is rested on such outdoor surfaces.

3. The portable light of claim 1, for use with devices powered by 12V DC vehicular power sockets, the portable light further comprising:
   a 12V DC vehicular power socket passing through the battery case, the 12V DC vehicular power socket having an operative electrical connection to such wiring, whereby such devices powered by 12V DC vehicular power sockets are plugged into such portable light and powered thereby.

4. The portable light of claim 1, wherein the battery comprises:
   a vehicular battery selected from the group consisting of: motorcycle batteries, car batteries, truck batteries, marine batteries, and combinations thereof.

5. The portable light of claim 1, wherein the colored LEDs comprise colors selected from the group consisting of: red, blue, amber, white, and combinations thereof.

6. The portable light of claim 1 for use with emergency/law enforcement vehicles having blinking light bars, wherein such mode selection switch has at least a first mode operative to cause the LED light strip LEDs to blink in a manner mimicking the blinking of such emergency/law enforcement vehicle blinking light bar.

7. The portable light of claim 1, for use with a 12V power socket, further comprising:
   a 12V power cord having male connectors at both ends, whereby the battery is charged/used for power by plugging the 12V power cord into both a 12V power socket of the case and such 12V power socket.

8. The portable light of claim 1, further comprising;
   an AC power cord having an AC electrical plug at one end, operatively connected to an AC to 12V DC power converter and thence to a 12V male connector.

9. The portable light of claim 1, for use with a vehicle having a vehicle battery having terminals and for use with a 12V power socket, the portable light further comprising:
   a 12V power cord having a male connector at one end and a pair of alligator clips at the other end, whereby the battery is charged / used for power by plugging the 12V power cord into a 12V power socket of the case and applying the pair of alligator clips to such vehicle battery terminals.

10. The portable light of claim 1, wherein such wiring further comprises:
    a fuse.

11. The portable light of claim 1, wherein the case further comprises:
    ribs providing structural support.

12. The portable light of claim 1, wherein the power switch further comprises a third setting in which partial current is allowed to flow.

13. The portable light of claim 1, wherein the colored LEDs comprise colors selected from the group consisting of: yellow, orange, pink, purple, green, UV, IR, full spectrum, and combinations thereof.

14. The portable light of claim 1, wherein the power switch further comprises:
    a current detector operative to measure the current remaining in the battery;
    a multi-colored power-level LED light disposed at the power switch, the multi-colored power-level LED light operative to display a first color when the LED flood light is turned on and the current detector finds that the battery has at least a first level of current, and to display a second color when the LED flood light is turned on and the current detector finds that the battery has at least a second level of current.

15. The portable light of claim 14, wherein the multi-colored power-level LED light is further operative to display a third color when the LED flood light is turned on and the current detector finds that the battery has at least a third level of current, and to display no light when the LED flood light is turned off.

* * * * *